UNITED STATES PATENT OFFICE.

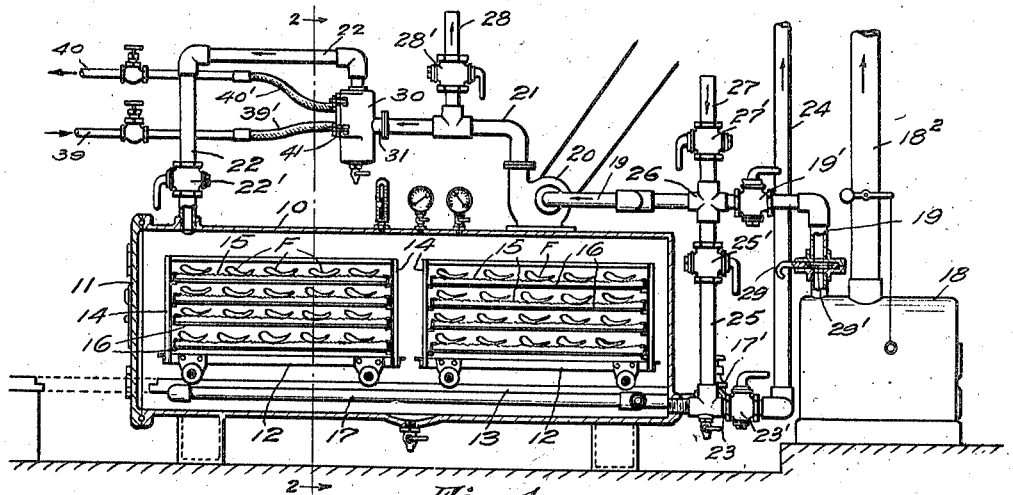
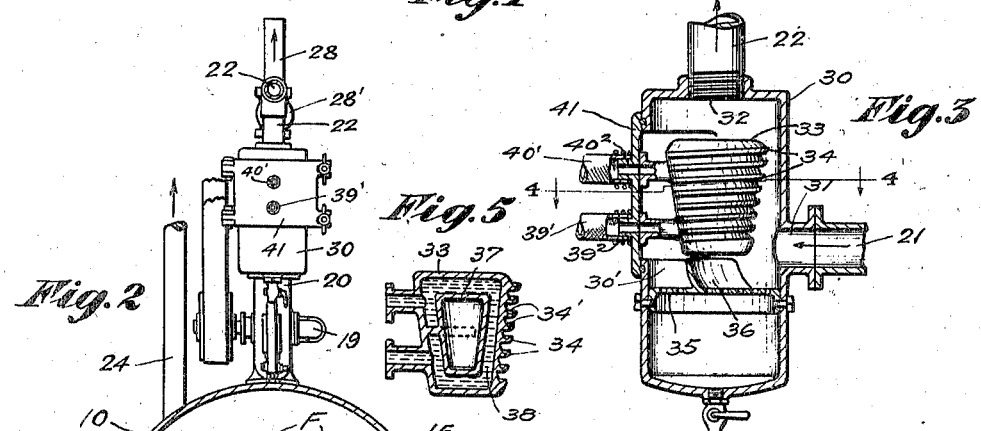
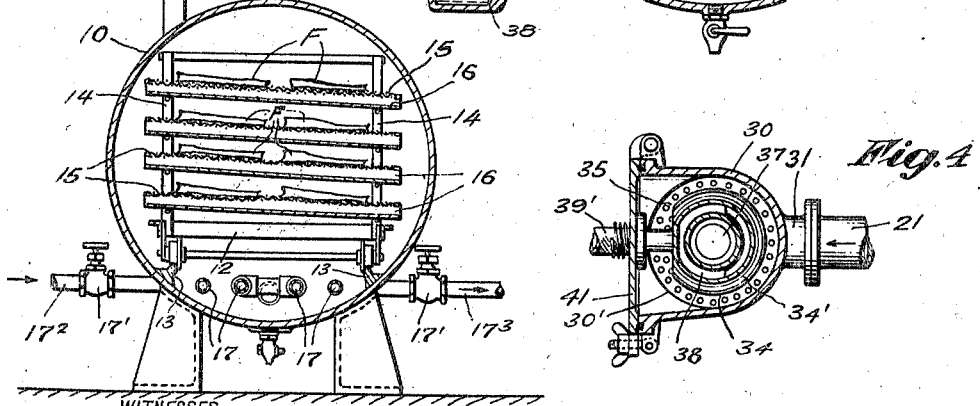

CARL G. ULLIN, OF ISSAQUAH, WASHINGTON.

APPARATUS FOR CURING AND PRESERVING FISH.

1,290,421. Specification of Letters Patent. Patented Jan. 7, 1919.

Application filed May 14, 1917. Serial No. 168,351.

*To all whom it may concern:*

Be it known that I, CARL G. ULLIN, a citizen of the United States, residing at Issaquah, in the county of King and State of Washington, have invented certain new and useful Improvements in Apparatus for Curing and Preserving Fish, of which the following is a specification.

This invention relates to apparatus for curing and preserving food products and, more especially, fish, by what is known as "cold smoking", "kippering", or similar processes.

The object of the present invention is to provide means whereby the various steps involved in the curing of fish may be efficiently and uninterruptedly performed in a commercially profitable manner.

The invention consists in the novel construction, adaptation and combination of devices, as will be hereinafter described and claimed.

In the accompanying drawings, Figure 1 is a view partly in side elevation and partly in vertical section of apparatus embodying the present invention.

Fig. 2 is a transverse vertical section through 2—2 of Fig. 1.

Fig. 3 is a longitudinal vertical section of the smoke-cleaning device shown in the preceding views.

Fig. 4 is a horizontal section through 4—4 of Fig. 3.

Fig. 5 is a longitudinal vertical section of the soot collector shown in Figs. 3 and 4.

In carrying out my invention I provide an air-tight tank or receptacle 10 having at one end doors such as 11 for the entry or removal of cars 12 which travel upon track rails 13. Said cars are each provided with a rack comprising upright posts 14 supporting shelves 15 upon which are placed the articles, such as fish F, to be treated. These shelves may advantageously be made of woven wire or foraminated plates so that the undersides of the fish may be exposed to the direct action of heat and smoke and also enable moisture to drop into the pans 16 provided in the rack below the respective shelves.

17 represents a pipe coil located within said tank for maintaining the same at suitable temperatures by means of steam which is admitted and discharged through pipe connections $17^2$ and $17^3$.

18 represents a furnace for producing smoke from a smoldering fire by suitably regulating the dampers thereof. A stack $18^2$ is provided for the furnace for the escape of combustion gases while starting a fire. Said furnace is connected by a smoke pipe 19 with the intake opening of a power-driven fan or blower 20 which, in turn, is connected through pipes 21 and 22 with the top of the tank chamber.

The lower end of this chamber is connected by an outlet pipe 23 having an extension 24 opening into the external atmosphere and with a branch 25 which communicates through a connection 26 with the pipe 19 leading to the blower.

27 represents a branch to the pipe 19 for the admission of air through the latter to said blower.

28 is a branch outlet pipe leading to the atmosphere from the pipe 21. Valves, indicated by $17^1$, $19^1$, $22^1$, $23^1$, $25^1$, $26^1$ and $28^1$ are provided to regulate the flow of fluids through the respective pipes.

Provided for the pipe 19 is a removable gate 29 having an opening across which extends a fine-meshed screen $29^1$ serving to prevent the passage of sparks or other large particles through the pipe. Provided in the pipe connections 22, between the blower 20 and the receptacle 10, is a smoke cleaner whose office is to eliminate the creosote and soot from the smoke which is to be utilized in the tank.

More particularly, said cleaner comprises a casing 30 having a smoke inlet 31 at a distance below its top in which is the smoke outlet 32. Located within said casing is a vessel 33 of an inverted truncated conical shape, preferably having external peripheral ribs 34 provided with grooves $34^1$ (Fig. 5) and disposed in inclined planes as shown in Fig. 3, so as to serve as gutters to drain any deposits which may collect therein to one side of the vessel to fall on a foraminated floor 35 at the side of the casing chamber $30^1$ remote from the smoke inlet 31.

Extending upwardly from this floor is a deflector 36 which serves to deflect the smoke upwardly against the vessel 33. Said vessel is provided interiorly with a centrally disposed core 37 to afford a restricted space 38 thereabout in which cooling water is caused to flow in passing between circulatory pipes 39 and 40.

To enable the vessel 33 to be withdrawn for cleaning purposes from said casing, the vessel is secured to a door 41 hingedly connected to the casing for closing an opening in the wall thereof.

To accommodate the movements of said door, I employ, preferably, flexible elements $39^1$ and $40^1$ for connecting the pipes 39 and 40 with coupling nipples $39^2$ and $40^2$ provided upon the door and affording communication with the interior of said vessel.

The operation of the invention is as follows:—

Fish after being cleaned and salted are placed upon the shelves 15 of the rack provided on a car 12 and thereby carried into the tank 10. The door 11 is then closed and the fish dried at a suitable temperature which may be attained by regulating the supply of steam to the coils 17.

During such drying action the moist air may be discharged from the tank through the pipe 24 by using the blower subsequent to closing valves $19^1$, $25^1$ and opening valves $23^1$, $27^1$. After the fish have been sufficiently dried, valves $23^1$, $27^1$ are closed, valves $25^1$, $28^1$ are opened to enable the blower to create a partial vacuum within the tank, whereupon valves $25^1$, $28^1$ are closed and valves $19^1$, $22^1$, are opened, resulting in smoke being supplied to the tank from the furnace. The blower is continued in operation until the pressure within the receptacle is best suited to penetrate the fish and which will vary according to the character and size of the fish and to the desired quality of the product.

The fish is subjected to the action of smoke either continuously or intermittently at a uniform or varying pressure until the smoking is completed and which may be performed under selected temperatures.

The drying and smoking steps of the curing process is not only very much facilitated by being accomplished under pressure but also produces a more tender and palatable article.

The fish is finally subjected to a cooking heat to "kipper" the same, and which may be done in the presence of smoke during the latter part of the smoking process or, as customarily done, after the smoking is finished.

Where time is important, the cooking and smoking may be done simultaneously.

The smoke in passing through the cleaner is, as shown in Fig. 3, directed by the deflector 36 against the water-cooled collector 33 upon which the soot and creosote is deposited, whence the greater part of such substances fall upon the partition and drain into the subjacent compartment.

Some of the material deposited on the collector will adhere thereto and can be scraped off after the collector has been withdrawn from the cleaner in the opening of the door 41.

What I claim, is—

1. In apparatus of the class described, the combination with a receptacle, and a smoke producing furnace, of smoke supply pipe connections extending from the furnace into the upper part of said receptacle and having a branch opening into the external atmosphere, a power-driven blower provided in said pipe connections, an outlet pipe extending from the lower part of said receptacle, and valves provided in said pipe connections in the branch thereof and in said outlet pipe, said valves being adapted to be regulated to enable said blower to cause either air or smoke selectively to travel downwardly through the receptacle or to supply the same into the latter to a predetermined pressure.

2. In apparatus of the class described, the combination with a receptacle, and a smoke-producing furnace, of pipe connections between the receptacle and the furnace and having a branch opening into the external atmosphere, a power-driven blower provided in said pipe connections, valves provided in the pipe connections and in the branch thereof, said valves being adapted to be regulated to enable said blower to cause either air or smoke selectively to travel through the receptacle or to supply the same into the latter to a predetermined pressure and means for heating the interior of said receptacle prior to and during the admission of smoke into the latter.

3. In apparatus of the class described, the combination with a receptacle, and a smoke-producing furnace, of pipe connections between the furnace and the upper part of said receptacle, said pipe connections having a branch opening into the external atmosphere, a power-driven blower provided in said pipe connections, an outlet from the lower part of said receptacle, and valves provided in the pipe connections, the branch thereof, and also in said outlet, said valves being adapted to be regulated to enable said blower to cause either air or smoke to be supplied to the receptacle to a predetermined pressure.

4. In apparatus of the class described, the combination with a receptacle, a steam pipe extending into said receptacle for heating the same, and a smoke-producing furnace, of pipe connections between the furnace and the upper part of the receptacle and having a branch opening into the external atmosphere, a power-driven blower provided in said pipe connections, an outlet extending from the lower part of said receptacle, and valves provided in the pipe connections, the branch thereof and also in said outlet, said valves being adapted to be regulated to enable said blower to cause either air or smoke selectively to travel through the receptacle or to supply the same into the latter to a predetermined pressure.

5. In apparatus of the class described, a furnace, a smoke receptacle, means to introduce articles to be treated into said receptacle, a power-driven blower, communicative connections between the blower and both the upper and lower parts of the receptacle and also between the blower and the furnace and with the external atmosphere, and valves for said connections whereby air may be exhausted from the receptacle into the external atmosphere or smoke from the furnace supplied to the receptacle at selected pressures and eventually exhausted into the atmosphere.

Signed at Issaquah, Wash., this 4th day of May, 1917.

CARL G. ULLIN.